Figure 1:
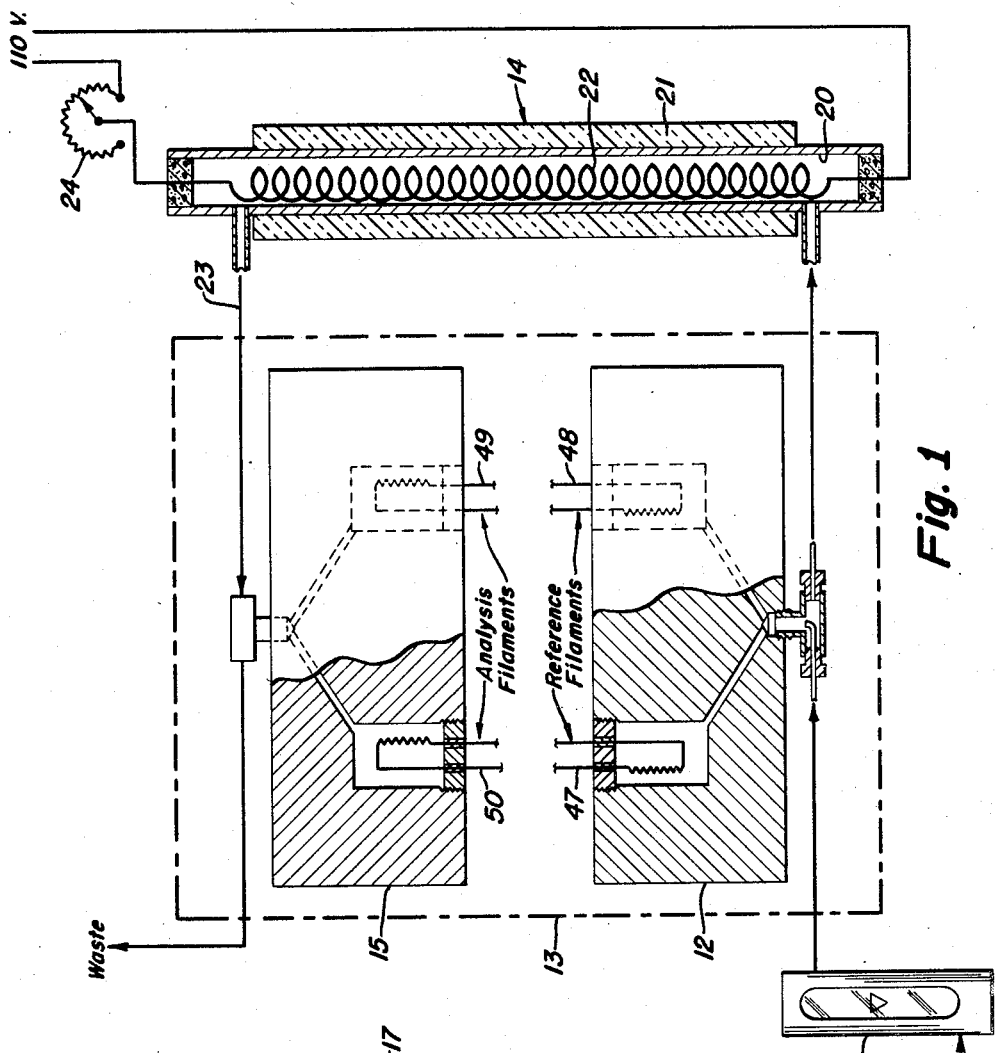

May 26, 1959     S. F. KAPFF     2,888,330
HYDROCARBON GAS ANALYZER AND METHOD
Filed March 20, 1957     3 Sheets-Sheet 1

INVENTOR.
Sixt Frederick Kapff

BY *Everett A. Johnson*

ATTORNEY

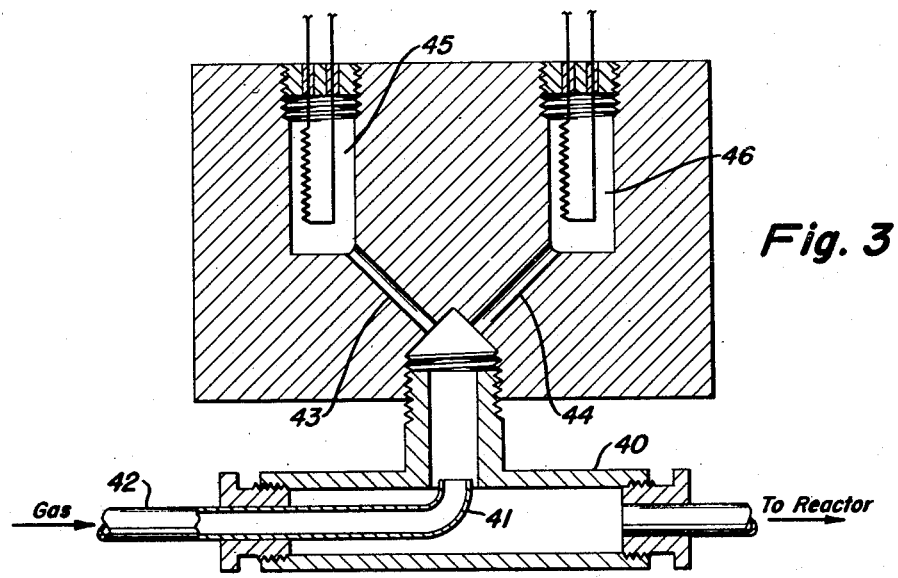
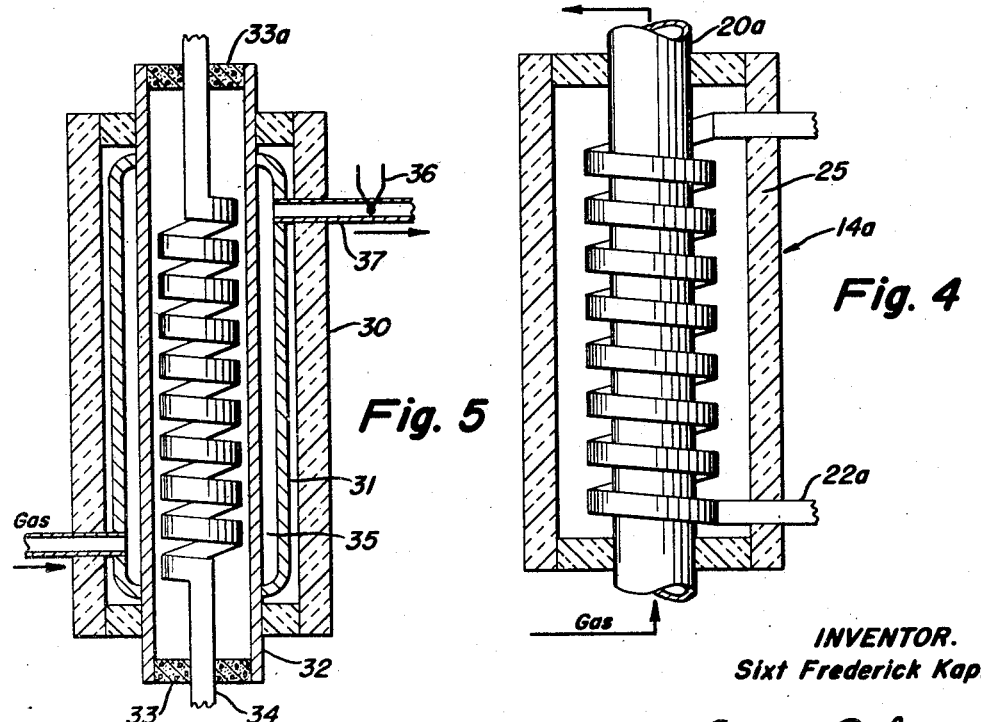

INVENTOR.
Sixt Frederick Kapff

BY *Everett A. Johnson*

ATTORNEY

United States Patent Office 2,888,330
Patented May 26, 1959

2,888,330

HYDROCARBON GAS ANALYZER AND METHOD

Sixt Frederick Kapff, Homewood, Ill., assignor to Standard Oil Company, Chicago, Ill., a corporation of Indiana Application March 20, 1957, Serial No. 647,304

4 Claims. (Cl. 23—232)

This invention relates to gas analysis and more particularly to a system for analyzing a gas stream containing isobutane by means of pyrolytic decomposition and thermal conductivity measurements. More generally, the invention relates to any gas analysis wherein a product of pyrolytic decomposition is hydrogen or other gas of high thermal conductivity.

In many refinery operations it is desired to monitor small concentrations of particular hydrocarbon gases in gas mixtures. For example in the preparation of pure isobutane for alkylation and other purposes, it is desired to analyze a bottoms stream from a fractionating column designed to take isobutane overhead. Such a stream may contain about 3 to 5 percent isobutane, 2 to 3 percent isopentane, and the remainder n-butane. The availability of isobutane to an alkylation unit may be the limiting factor in the capacity of such unit. The shortage of isobutane may require by-passing fresh olefinic feed around the reactors which in turn increases acid consumption and decreases the plant capacity for producing alkylate. Accordingly there are many incentives for controlling the split or recovery of isobutane from admixtures with normal butane so as to obtain maximum isobutane utilization.

It is therefore a primary object of this invention to provide a system for the rapid and accurate determination of isobutane concentrations. A further object is to provide a system wherein the concentration of isobutane can be ascertained in the presence of isopentane and normal butane. A further object of the invention is to provide a system employing thermal conductivity cell means for indicating concentrations of isobutane in hydrocarbon mixtures.

An additional object of the invention is to provide an apparatus which is specific to isobutane and adapted for analysis of dilute concentrations of isobutane in gas mixtures containing n-butane and isopentane. Still another object of the invention is to provide an apparatus and method which is simple and fool-proof in its operation. These and other objects of my invention will become apparent as the description thereof proceeds.

Briefly, according to my invention, I provide an analyzer system comprising a thermal conductivity cell and a pyrolysis chamber specific for the decomposition of isobutane to hydrogen. The stream of gas to be analyzed is passed through one leg of the thermal conductivity cell and thence to the pyrolytic decomposition chamber wherein the isobutane is preferentially decomposed. The sample stream, enriched with decomposition product, then passes to a second thermal conductivity cell of the analyzer wherein the hydrogen produced by the pyrolytic decomposition of isobutane has a dominant effect. The electrical unbalance of the two cells is determined with a Wheatstone bridge as a measure of the concentration of isobutane in the sample stream.

Figure 2:
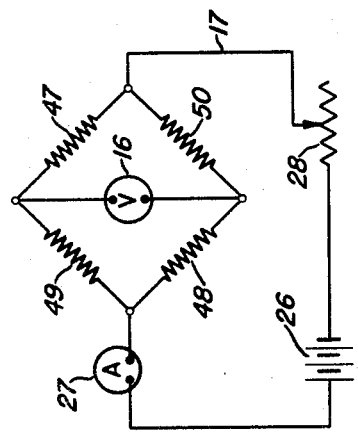
Figure 6:
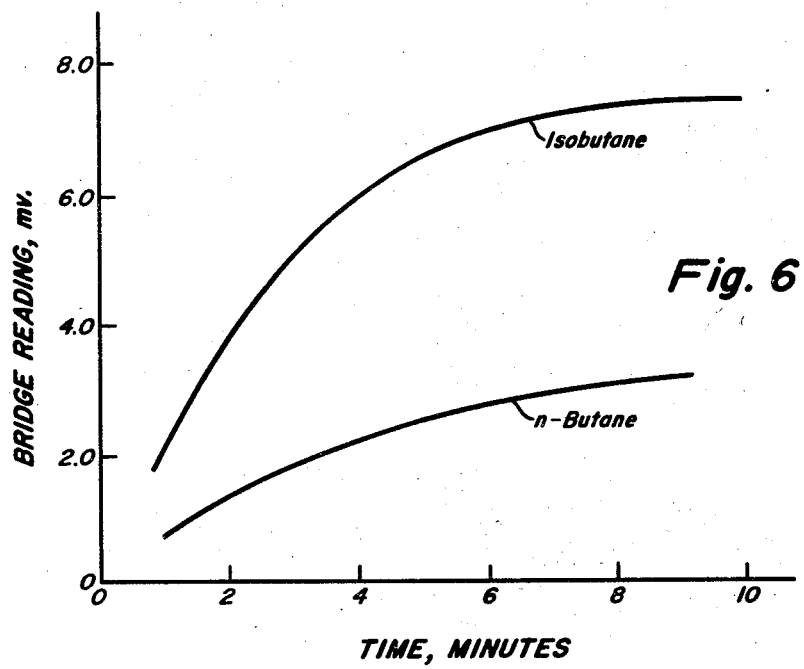

Further details and advantages of my system will be described by reference to preferred embodiments thereof illustrated in the drawings and wherein:

Figure 1 is a schematic representation of the apparatus shown partly in section;
Figure 2 is a circuit diagram for the analyzer in Figure 1;
Figure 3 is a vertical section showing details of the thermal conductivity cell employed in my apparatus;
Figure 4 is an enlarged detail, partly in section, of an embodiment of a reactor used in my apparatus;
Figure 5 illustrates a second embodiment of a pyrolysis chamber;
Figure 6 sets forth curves based upon bridge readings for pure isobutane and pure n-butane; and
Figure 7 comprises curves based upon bridge readings for various reactor voltages.

Referring to Figure 1, the gas sample is fed at a constant rate via line 10 and rate meter 11 into the reference side 12 of the thermal conductivity cell 13. The gas then passes through the pyrolytic decomposition chamber 14 and through the analysis side 15 of the thermal conductivity cell 13. The deflection observed on the meter 16 in the bridge circuit 17 including the filaments 47, 48, 49, 50 of the thermal conductivity cell 13 is a function of the degree of decomposition produced in the reactor or chamber 14 as well as the amount of hydrogen produced.

The distinction between n-butane and isobutane is based upon the fact that isobutane is more easily decomposed than n-butane and in addition forms more hydrogen upon such decomposition. Hydrogen has such a high thermal conductivity compared to other gases produced in the decomposition, that the bridge reading on the meter 16 will be largely a reflection of its concentration.

The reactor 14 shown in Figure 1 comprises a pyrolysis tube 20 provided with insulation 21 and containing a spiral 22 of platinum wire electrically heated to the temperature necessary to produce decomposition of the isobutane introduced into the reactor 14 via inlet line 10 and withdrawn therefrom via outlet line 23. A rheostat 24 is used to control input to the heating coil 22 from a power supply such as an A.C. line.

The type of results obtained with my apparatus when pure gases are introduced into the reactor 14 is shown in Figure 6 where the reading of meter 16 in the bridge 17 (Figure 2) including the thermal conductivity cell 13 is plotted against time. Equilibrium readings can be seen to be much greater for isobutane than for n-butane.

Figure 7:
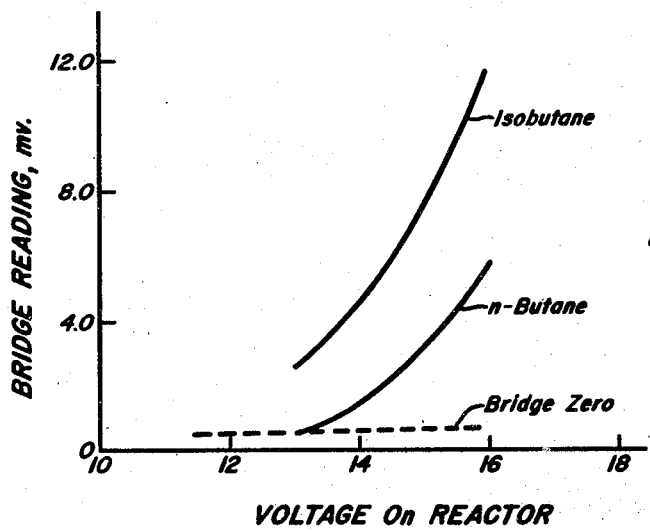

The temperature to which the platinum wire coil 22 is heated has considerable effect upon the relative amounts of decomposition observed for both n-butane and isobutane. Variations in this temperature can be made by changing the voltage on the recorder 14 by adjusting the rheostat 24. The thermal conductivity bridge readings for various reactor voltages are shown in Figure 7; quite large deflections are shown, with the isobutane readings being higher than the readings for n-butane at all temperature settings.

More reaction can be obtained by raising the temperature, decreasing the flow rate at a given temperature, or changing the heating equipment to yield longer residence times for the gases under test. The optimum situation is that which gives the maximum decomposition of isobutane and little or no decomposition of n-butane and isopentane.

The reactor 14 can take various forms and small cross-section improves resolution between n-butane and isobutane indicating that decreased residence time is advantageous. A reactor 14a of this type is schematically shown in Figure 4. In Figure 4 the reactor 14a comprises a straight tube 20a of quartz about 6 mm. I.D. which is heated radiantly by means of Nichrome ribbon electrical resistance heater 22a wound about a central section of the quartz tube 20a for a length of about 5 inches. The unit is completed by heat insulation 25. A flow rate of about 20 cc. per minute through the reactor 14a, corresponding to a residence time of about 10 seconds within the heated zone, gives a sufficient reaction.

Referring to Figure 5, the reactor comprises the insulating housing 30, the reactor shell 31 and a heating unit within the shell 31 which comprises a quartz tube 32 closed at both ends by plugs 33 and 33a and a Nichrome ribbon electrical heater unit 34 supported between the plugs 33 and 33a. The gas sample flows through the annular space 35 between the heated quarz tube 32 and the insulated reactor shell 31. The temperature of the reaction space 35 is controlled by placing a thermocouple 36 in the gas stream flowing from the exit conduit 37 and temperatures maintained in the range of 500–550° C. have been found satisfactory.

The thermal conductivity cell of Figure 3 is provided with a T-shaped fitting 40 containing angular nozzle 41 on line 42 which directs the gas flow upwardly toward the inlets 43 and 44 to the filament chambers 45 and 46. Much faster response is obtained by this arrangement without introducing any flow sensitivity.

The Wheatstone bridge circuit of Figure 2 uses the reference filaments 47 and 48 and the analysis filaments 49 and 50 as the 4 arms of the bridge 17. As shown in Figure 2, the reference filaments 47 and 48 are on opposite arms of the bridge circuit 17.

The meter 16, battery 26, ammeter 27, and control 28 complete the bridge 17. Zero balancing is obtained by connecting variable resistors (not shown) across the appropriate pairs of reference and analysis filaments 47—48 and 49—50, respectively. These resistors may then be adjusted to the same settings thus assuring that corresponding reference and analysis filaments are run identically. This system of zeroing serves to increase bridge stability.

In each of the reactors 14, 14a and 35 of Figures 1, 4 and 5, the tubes 20 and 32 comprise quartz, such tubes having a negligible effect on the decomposition of isobutane, n-butane and isopentane. However, it is contemplated that other materials may be used that are substantially inert to the decomposititons and which have good heat transfer characteristics.

From the description herein it will be apparent that I have attained the objects of my invention and have provided a method and apparatus for the accurate measurement and recording of isobutane concentrations occurring in the presence of n-butane and isopentane. It is contemplated, however, that although I have described my invention with respect to preferred embodiments, the system can be applied to plant operation control involving analyses of other gases wherein the products of pyrolytic decomposition include a gas of high thermal conductivity other than hydrogen. It is intended therefore that the detail description of the preferred embodiments is for the purposes of illustration only and that changes and modifications can be made in the described systems by those skilled in the art without departing from the spirit and scope of the invention.

What I claim is:

1. The method of determining the isobutane content of a sample hydrocarbon gas stream containing normal butane which includes making a first thermal conductivity measurement on said stream, pyrolytically decomposing isobutane selectively in admixture with normal butane, subjecting the stream of decomposition products including the normal butane and produced hydrogen to a second thermal conductivity measurement, and determining from said measurements the concentration of hydrogen in the decomposition products as a measure of the initial isobutane content of the sample gas stream.

2. In a hydrocarbon gas analysis apparatus, first electrical means responsive to the thermal conductivity of a gas sample, said means comprising a pair of filament chambers, inlets to said chambers merging into a T-shaped fitting, gas inlet means projecting into said fitting and having its terminal end directed toward the said inlets, reactor means for pyrolytically decomposing isobutane in said gas sample, said reactor means comprising an insulated housing, a reactor shell within said housing, and a heating unit within said shell comprising a quartz tube closed at both ends and containing a Nichrome ribbon electrical heater unit, second electrical means similar to said first electrical means and responsive to the thermal conductivity of the pyrolyzed product, and Wheatstone bridge means including said first and second electrical means for determining electrical unbalance between said first and second electrical means as an indication of the concentration of isobutane removed from said gas sample by the pyrolysis.

3. A thermal conductivity cell comprising electrical means responsive to the thermal conductivity of a flowing gas sample which comprises in combination a gas sample conduit, a T-shaped fitting on said conduit, an angular nozzle on said conduit projecting within said fitting and directing a gas stream outwardly thereof, a pair of filament chambers, a pair of inlets to said chambers merging into an inlet manifold, said fitting being connected to said manifold and said nozzle directing flow from said fitting into said manifold.

4. In a hydrocarbon gas analysis apparatus, first electrical means responsive to the thermal conductivity of a gas sample, means for pyrolytically decomposing a component of said gas sample, second electrical means responsive to the thermal conductivity of the decomposition product, and electrical bridge means for determining the electrical unbalance of the said first and second electrical means as an indication of the concentration of said component in said gas sample, said first electrical means comprising a pair of filament chambers, inlets to said chambers merging into a T-shaped fitting, and gas inlet means projecting into said fitting and having a terminal end directed toward the said inlets.

References Cited in the file of this patent

UNITED STATES PATENTS

| 1,321,064 | Lamb et al. | Nov. 4, 1919 |
| 1,681,047 | Porter | Aug. 14, 1928 |
| 1,918,702 | Kebler et al. | July 18, 1933 |
| 1,971,038 | Hamilton | Aug. 21, 1934 |
| 2,757,362 | Gutkowski | July 31, 1956 |

FOREIGN PATENTS

| 15,706 | Great Britain | A.D. 1904 |